United States Patent Office 2,776,300
Patented Jan. 1, 1957

2,776,300

BASIC ESTERS OF SUBSTITUTED 3,4-DIHYDRO-1,2-PYRAN-5-CARBOXYLIC ACIDS AND SALTS THEREOF

William W. Jenkins, Wilmette, Ill., assignor, by mesne assignments, to G. D. Searle & Co., Skokie, Ill., a corporation of Delaware No Drawing. Application August 31, 1951,
Serial No. 244,711

15 Claims. (Cl. 260—345.8)

The present invention relates to a new class of organic heterocyclic compounds and specifically to the basic esters of substituted 3,4-dihydro-1,2-pyran-5-carboxylic acids and the salts thereof. The compounds can be represented by the structural formula

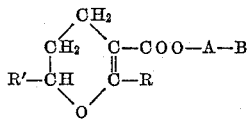

wherein R is a lower hydrocarbon radical, R' is either hydrogen or a lower hydrocarbon radical, A is a saturated lower bivalent aliphatic hydrocarbon radical and B is either a dialkylamino radical or a saturated heteromonocyclic radical attached through a nitrogen in the said heteromonocycle to the radical A.

In the foregoing structural formula R and R' can represent lower alkyl radicals as methyl, isopropyl, sec-butyl, and the like. In addition R can represent a lower cyclic radical such as cyclopropyl, cyclobutyl, cyclopentyl, cyclohexyl, methylcyclopentyl, ethylcyclohexyl, cyclohexenyl, phenyl, tolyl, xylyl, and phenylethyl. R' can also be hydrogen. The radical A represents a bivalent, saturated, aliphatic hydrocarbon radical of from two to eight carbon atoms; this radical is derived from a straight-chain or branched-chain aliphatic hydrocarbon such as ethylene, propylene, butylene, amylene or a polymethylene radical such as trimethylene, tetramethylene, pentamethylene, and hexamethylene.

The radical B can represent a lower dialkylamino radical such as dimethylamino, diethylamino, dipropylamino, diisopropylamino, dibutylamino, diisobutylamino, di-sec-butylamino, diamylamino, and dihexylamino; this radical may also be a saturated nitrogen-containing heterocyclic radical attached to the alkylene radical through a nitrogen in the heterocycle and such heterocyclic radicals as piperidino, lupetidino, pyrrolidino, morpholino, thiamorpholino, piperazino and N'-alkylpiperazino are within the scope of the invention.

The organic bases of the foregoing type form salts with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, oxalic, ascorbic and related acids. They also form quaternary ammonium salts with a variety of organic esters of sulfuric, hydrohalic and aromatic acids. Among such esters are methyl chloride and bromide, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The acids which constitute the starting materials for the compounds disclosed and claimed in the present invention are prepared most conveniently by the Perkin method which can be represented schematically as follows, R and R' having the foregoing meanings:

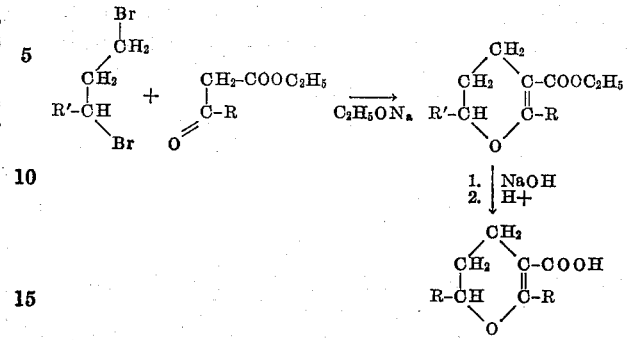

The esters which constitute this invention are valuable therapeutic agents. The free bases and the acid addition salts have been shown to exert a pronounced effect on the cardiovascular system, while the quaternary salts have been shown to be potent inhibitors of autonomic nervous functions. Certain other compounds disclosed and claimed herein are valuable in the preparation of parasiticidal compositions of matter.

The compounds which constitute this invention and the methods for preparing the same will be described more fully in the following examples. It should be obvious, however, that these examples are given by way of illustration only and that the invention is not to be construed as limited thereby in spirit or in scope. It will be apparent to those skilled in the art that many modifications in procedures and materials may be made without departing from the invention. In each of the subsequent examples temperatures are given uncorrected in degrees centigrade (°C.), pressure during vacuum distillation in millimeters (mm.) of mercury, and quantities of materials in parts by weight.

EXAMPLE 1

*β-Diethylaminoethyl ester of 6-methyl-3,4-dihydro-1,2-pyran-5-carboxylic acid*

A mixture of 233 parts of 6-methyl-3,4-dihydro-1,2-pyran-5-carboxylic acid and 214 parts of β-chloroethyldiethylamine in 1200 parts of absolute 2-propanol is heated at reflux temperature for 5.5 hours and then permitted to stand for several hours. The solvent is stripped under reduced pressure and the residue is dissolved in water. The aqueous solution is separated, washed with ether, rendered alkaline by addition of sodium hydroxide and extracted with ether. The extract is washed with water, dried over anhydrous potassium carbonate and evaporated. The residue is dissolved in 2500 parts of absolute ether and one equivalent of hydrogen chloride in absolute ethanol solution is added. Upon chilling the hydrochloride precipitates. After filtering and drying the salt is reconverted into the free base by treatment with alkali, extraction with ether and evaporation of the solvent. The β-diethylaminoethyl ester of 6-methyl-3,4-dihydro-1,2-pyran-5-carboxylic acid thus obtained boils at about 120–123° C. and 1 mm. pressure. The hydrochloride obtained therefrom melts at about 147–148° C. It has the structural formula

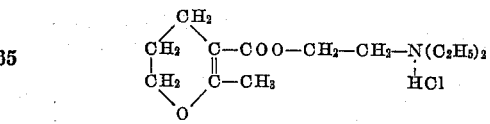

EXAMPLE 2

*β - (6 - methyl - 3,4 - dihydro - 1,2 - pyran - 5 - carboxy) ethyldiethylmethylammonium bromide*

160 parts of the β-diethylaminoethyl ester of 6-methyl- 3,4 - dihydro - 1,2 - pyran - 5 - carboxylic acid are dissolved in 750 parts of chloroform and treated with 70 parts of methyl bromide. The mixture is sealed in a shielded pressure reactor and heated at 80° C. for 10 hours. The solvent is then removed and the residue treated with benzene. When granulation is complete, the product is collected and dried. The β - (6 - methyl-3,4 - dihydro - 1,2 - pyran - 5 - carboxy)ethyldiethylmethylammonium bromide thus dried is rather hygroscopic. It has the structural formula

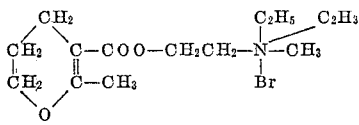

EXAMPLE 3

*β - Diisopropylaminoethyl ester of 6 - methyl - 3,4-dihydro - 1,2 - pyran - 5 - carboxylic acid*

A mixture of 213 parts of 6 - methyl - 3,4 - dihydro-1,2 - pyran - 5 - carboxylic acid, 178 parts of thionyl chloride, 118 parts of anhydrous pyridine and 880 parts of benzene is heated at reflux temperature for 100 minutes. The mixture is then cooled, filtered and the precipitate washed with a small amount of benzene. The filtrates are combined and mixed with 218 parts of β-diisopropylaminoethanol and then heated at reflux temperature for 8 hours. The mixture is extracted 3 times with water and the aqueous extracts are combined, washed with ether, rendered alkaline by addition of sodium hydroxide and then extracted with ether. The ether extract is washed with water, dried and evaporated. The β - diisopropylaminoethyl ester of 6 - methyl - 3,4 - dihydro - 1,2 - pyran - 5 - carboxylic acid obtained in the residue is distilled at about 125–128° C. and 0.3 mm. pressure. 67 parts of the base are dissolved in 710 parts of anhydrous ether and treated with one equivalent of a solution of hydrogen chloride in absolute ethanol. Upon standing the hydrochloride precipitates which after drying and recrystallization from a mixture of ethyl acetate and 2-propanol melts at about 147° C.

EXAMPLE 4

*β - (6 - methyl - 3,4 - dihydro - 1,2 - pyran - 5 - carboxy) ethyldiisopropylmethylammonium bromide*

110 parts of the β-diisopropylaminoethyl ester of 6-methyl - 3,4 - dihydro - 1,2 - pyran - 5 - carboxylic acid are dissolved in 450 parts of chloroform and treated with 40 parts of methyl bromide and the solution is heated for 24 hours at 80° C. in a sealed pressure reactor. The solvent is then stripped and the remaining oil suspended in anhydrous ether and thus caused to granulate. Upon recrystallization from butanone the β - (6 - methyl - 3,4-dihydro - 1,2 - pyran - 5 - carboxy)ethyldiisopropylmethylammonium bromide melts at about 130–131° C. It has the structural formula

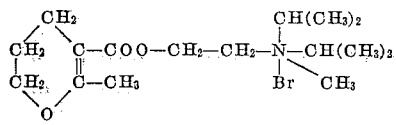

EXAMPLE 5

*β - Diethylaminoethyl ester of 6 - phenyl - 3,4 - dihydro-1,2 - pyran - 5 - carboxylic acid*

A solution of 230 parts of 6 - phenyl - 3,4 - dihydro-1,2 - pyran - 5 - carboxylic acid and 153 parts of β-chloroethyldiethylamine in 1000 parts of absolute 2-propanol is heated at reflux temperature for 6.5 hours. The solvent is then distilled in vacuum and the residue is dissolved in water, washed with ether, rendered alkaline by addition of potassium hydroxide and extracted with ether. The ether extract is dried over anhydrous potassium carbonate, filtered and evaporated. The β-diethyl- aminoethyl ester of 6 - phenyl - 3,4 - dihydro - 1,2 - pyran-5 - carboxylic acid boils at about 160–165° C. and 0.7–0.9 mm. pressure. 227 parts of the base are dissolved in 5,700 parts of absolute ether and treated with one equivalent of a solution of hydrogen chloride in absolute ethanol. Upon recrystallization from ethyl acetate the hydrochloride melts at about 122–123° C.

EXAMPLE 6

*β - (6 - phenyl - 3,4 - dihydro - 1,2 - pyran - 5 - carboxy) ethyldiethylmethylammonium iodide*

210 parts of the β-diethylaminoethyl ester of 6-phenyl-3,4 - dihydro - 1,2 - pyran - 5 - carboxylic acid are dissolved in 750 parts of chloroform and treated in a sealed pressure reactor with 210 parts of methyl iodide. After standing for 12 hours the solvent is stripped and the residue dissolved in ether. The resulting precipitate is recrystallized from absolute isopropanol and melts at about 124–125° C. It has the structural formula

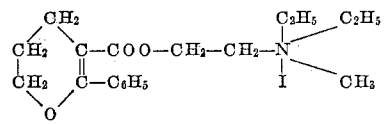

EXAMPLE 7

*β - Diisopropylaminoethyl ester of 6 - phenyl - 3,4 - dihydro - 1,2 - pyran - 5 - carboxylic acid*

To a solution of 23 parts of metallic sodium in 1200 parts of absolute 2-propanol are added 204 parts of 6-phenyl - 3,4 - dihydro - 1,2 - pyran - 5 - carboxylic acid and 200 parts of the hydrochloride of β-chloroethyldiisopropylamine. The mixture is heated at reflux temperature for 9 hours, and after standing for several hours, the solvent is removed under vacuum. The residue is treated with water, washed with ether to remove some unreacted 6 - phenyl - 3,4 - dihydro - 1,2 - pyran - 5-carboxylic acid, and then rendered alkaline. The base is extracted with ether and the ether extract dried over anhydrous potassium carbonate, filtered and evaporated. The β-diisopropylaminoethyl ester of 6 - phenyl - 3, 4-dihydro - 1,2 - pyran - 5 - carboxylic acid boils at about 158–163° C. and 0.25–0.3 mm. pressure. Treatment of an ether solution of the base with one equivalent of hydrogen chloride in absolute ethanol and recrystallization of the resulting hydrochloride from absolute ethyl acetate yields crystals which melt at about 92–94° C.

EXAMPLE 8

*β(6-phenyl-3,4-dihydro-1,2-pyran-5-carboxy)ethyldiisopropylmethylammonium bromide*

A solution of 155 parts of the β-diisopropyl-aminoethyl ester of 6-phenyl-3,4-dihydro-1,2-pyran-5-carboxylic acid and 260 parts of methyl bromide in 750 parts of chloroform is heated in a sealed vessel at 85° C. for 12 hours. After standing for some time the solvent is stripped under vacuum and the residue suspended in 3000 parts of absolute ether. The β-(6-phenyl-3,4-dihydro-2-pyran-5-carboxy)ethyldiisopropylmethylammonium bromide precipitates and upon recrystallization from butanone melts at about 127–128° C.

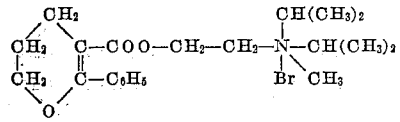

EXAMPLE 9

*β-(1-piperidino)ethyl ester of 6-phenyl-3,4-dihydro-1,2-pyran-5-carboxylic acid*

16.5 parts of metallic sodium are dissolved in 800 parts of absolute 2-propanol by boiling. After cooling the solution is heated with 145 parts of 6-phenyl-3,4-dihydro-1,2-pyran-5-carboxylic acid and 131 parts of the hydrochloride of 1-(β-chloroethy)piperidine for 5 hours at reflux temperature. The mixture is then treated with water and the aqueous layer is separated, rendered alkaline by the addition of sodium hydroxide and extracted with ether. The extract is dried over anhydrous potassium carbonate, filtered and evaporated. The β-(1-piperidino)ethyl ester of 6-phenyl-3,4-dihydro-1,2-pyran-5-carboxylic acid is distilled at about 185–195° C. and 3.5–4 mm. pressure.

EXAMPLE 10

*β-(6-phenyl-3,4-dihydro-1,2-pyran-5-carboxy)ethyl-methyl-piperidinium bromide*

115 parts of the β-(1-piperidino)ethyl ester of 6-phenyl-3,4-dihydro-1,2-pyran-5-carboxylic acid and 61 parts of methyl bromide in 240 parts of butanone are mixed and maintained in a pressure reactor at room temperature. Within 15 minutes an oil separates which begins to solidify after 3 hours. After standing for several days anhydrous ether is added and the white crystalline precipitate of β-(6-phenyl-3,4-dihydro-1,2-pyran-5-carboxy)-ethylmethyl-piperidinium bromide is collected on a filter. It has the structural formula

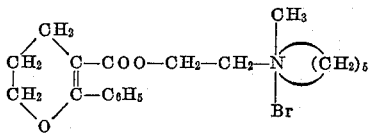

EXAMPLE 11

*Diethylaminoethyl ester of 2,6-dimethyl-3,4-dihydro-1,2-pyran-5-carboxylic acid*

A mixture of 234 parts of 2,6-dimethyl-3,4-dihydro-1,2-pyran-5-carboxylic acid and 203 parts of β-chloroethyldiethylamine in 800 parts of absolute 2-propanol is heated at reflux temperature for 6 hours. The solvent is stripped in vacuum and the residue is dissolved in water, washed with ether and rendered alkaline by the addition of ammonium hydroxide. The alkaline solution is extracted with ether and the ether extract dried over anhydrous potassium carbonate, filtered and evaporated. The diethylaminoethyl ester of 2,6-dimethyl-3,4-dihydro-1,2-pyran-5-carboxylic acid is distilled at about 128–132° C. and 1 mm. pressure. The hydrochloride is prepared by treatment of an ether solution of the base with one equivalent of an absolute alcohol solution of hydrogen chloride. Upon recrystallization from ethyl acetate the hydrochloride melts at about 148–149.5° C.

EXAMPLE 12

*β(2,6-dimethyl-3,4-dihydro-1,2-pyran-5-carboxy)ethyl-diethylmethylammonium bromide*

70 parts of the diethylaminoethyl ester of 2,6-dimethyl-3,4-dihydro-1,2-pyran-5-carboxylic acid, 121 parts of methyl bromide and 450 parts of chloroform are mixed in a sealed reactor and warmed for 3 hours at 85° C. After cooling the solvent is evaporated in vacuum and the residue suspended in absolute ether. The resulting crystals are very hygroscopic. Upon recrystallization from a mixture of butanone and ethyl acetate the β-(2,6-dimethyl-3,4-dihydro-1,2-pyran-5-carboxy)ethyldiethylmethylammonium bromide melts at about 105.5–106.5° C. It has the structural formula

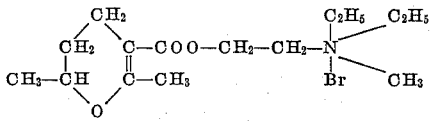

EXAMPLE 13

*Diisopropylaminoethyl ester of 2,6-dimethyl-3,4-dihydro-1,2-pyran-5-carboxylic acid*

To a cool solution of 32 parts of metallic sodium in 1600 parts of absolute 2-propanol, 215 parts of 2,6-dimethyl-3,4-dihydro-1,2-pyran-5-carboxylic acid are added and the mixture is shaken until solution is practically complete. 276 parts of the hydrochloride of β-chloroethyldiisopropylamine are then added and the mixture heated at reflux temperature for 8 hours. After concentration, water is added and the aqueous layer is separated, washed with ether and rendered alkaline by the addition of sodium hydroxide. The base is extracted with ether and the extract dried over anhydrous potassium carbonate, filtered and evaporated. The diisopropylaminoethylester of 2,6-dimethyl-3,4-dihydro-1,2-pyran-5-carboxylic acid boils at about 129–131° C. and 0.5 mm. pressure. 87 parts of the base thus obtained are dissolved in 3000 parts of absolute ether and the solution treated with one equivalent of hydrogen chloride in absolute ethanol. The hydrochloride precipitates at once. Recrystallized from a mixture of ethyl acetate and 2-propanol it melts at about 168.5–170° C.

EXAMPLE 14

*β-(2,6-dimethyl-3,4-dihydro-1,2-pyran-5-carboxy)ethyldiisopropylmethylammonium bromide*

130 parts of the diisopropylaminoethyl ester of 2,6-dimethyl-3,4-dihydro-1,2-pyran-5-carboxylic acid are mixed with 135 parts of methyl bromide in 600 parts of chloroform, sealed and warmed at 85° C. for 12 hours. After cooling the solvent is evaporated under vacuum and the residue is granulated by suspension in ether. The crystals are collected on a filter, dried and recrystallized from butanone. The β-(2,6-dimethyl-3,4-dihydro-1,2-pyran-5-carboxy)ethyldiisopropylmethylammonium bromide melts at about 130.5–131° C. and has the structural formula

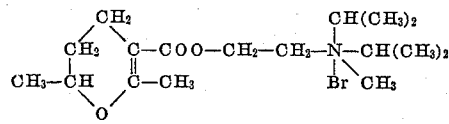

EXAMPLE 15

*β-Diethylaminoethyl ester of 2-methyl-6-phenyl-3,4-dihydro-1,2-pyran-5-carboxylic acid*

A mixture of 218 parts of 2-methyl-6-phenyl-3,4-dihydro-1,2-pyran-5-carboxylic acid, 136 parts of β-chlorodiethylamine and 1200 parts of 2-propanol is heated at reflux temperature for 5 hours. After standing for 12 hours it is extracted with water and the water extract is washed with ether and rendered alkaline by the addition of sodium hydroxide. The base is extracted with ether and the ether extract dried over anhydrous potassium carbonate, filtered and evaporated. The β-diethylaminoethyl ester of 2-methyl-6-phenyl-3,4-dihydro-1,2-pyran-5-carboxylic acid is distilled at about 153–157° C. and 0.3–0.4 mm. pressure. A solution of 85 parts of the base in 3000 parts of absolute ether is treated with an excess of hydrogen chloride in absolute ethanol. The immediately percipitating hydrochloride is collected on a filter and recrystallized from a mixture of ethyl acetate and 2-propanol. It melts at about 128–129° C.

EXAMPLE 16

*β-(2-methyl-6-phenyl-3,4-dihydro-1,2-pyran-5-carboxy)ethyldiethylmethylammonium iodide*

92 parts of the β-diethylaminoethyl ester of 2-methyl-6-phenyl-3,4-dihydro-1,2-pyran-5-carboxylic acid are dissolved in 160 parts of butanone and treated with 91 parts of methyl iodide. The reactants are sealed in a bottle and maintained at room temperature for 48 hours. The solvent is then distilled off under vacuum and the residue granulated under anhydrous ether. The yellow precipitate is dried and recrystallized from a mixture of butanone and ethyl acetate. The β-(2-methyl-6-phenyl-3,4-dihydro-1,2-pyran-5-carboxy)ethyldiethylmethylammonium iodide melts at about 99–100° C. and has the structural formula

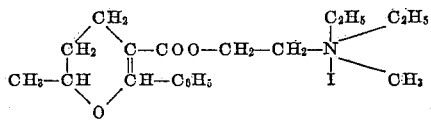

EXAMPLE 17

*Diisopropylaminoethyl ester of 2-methyl-6-phenyl-3,4-dihydro-1,2-pyran-5-carboxylic acid*

To a cool solution of 12.7 parts of metallic sodium in 800 parts of absolute 2-propanol are added 120 parts of 2-methyl-6-phenyl-3,4-dihydro-1,2-pyran-5-carboxyl acid and 110 parts of β-chloroethyldiisopropylamine. After heating at reflux temperature for 5 hours the solvent is stripped under vacuum and the mixture extracted with water. The aqueous extract is washed with ether and rendered alkaline by the addition of ammonium hydroxide. The base is extracted with ether and the extract dried over anhydrous potassium carbonate, filtered and evaporated. The β-diisopropylaminoethyl 2-methyl-6-phenyl-3,4-dihydro-1,2-pyran-5-carboxylate is distilled at about 163–165° C. and 0.2–0.3 mm. pressure. 50 parts of the base are dissolved in 3000 parts of absolute ether and treated with an equivalent of hydrogen chloride in absolute ethanol. The oily product granulates on standing within a short time. Recrystallized from ethyl acetate, β-diisopropylaminoethyl 2-methyl-6-phenyl-3,4-dihydro-1,2-pyran-5-carboxylate hydrochloride melts at about 143.5–144.5° C.

EXAMPLE 18

*β-(2-methyl-6-phenyl - 3,4 - dihydro - 1,2 - pyran - 5 - carboxy)ethyldiisopropylmethylammonium bromide*

85 parts of β-diisopropylaminoethyl 2-methyl-6-phenyl-3,4-dihydro-1,2-pyran-5-carboxylate are mixed with 87 parts of methyl bromide in 450 parts of chloroform and warmed in a sealed pressure vessel at 85° C. for 12 hours. The solvent is removed under reduced pressure and the residue suspended in ether. The β-(2-methyl-6-phenyl-3,4-dihydro - 1,2 - pyran - 5 - carboxy)ethyldiisopropylmethylammonium bromide granulates in a short time. Recrystallized from butanone, it melts at about 120.5–121° C. It has the structural formula

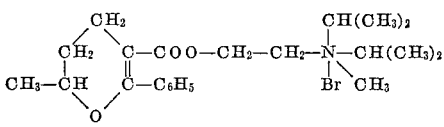

EXAMPLE 19

*β-Morpholinoethyl ester of 2-methyl-6-phenyl-3,4-dihydro-1,2-pyran-5-carboxylic acid*

13.2 parts of metallic sodium are dissolved in 800 parts of absolute 2-propanol by boiling. The solution is cooled and treated with 125 parts of 2-methyl-6-phenyl-3,4-dihydro-1,2-pyran-5-carboxylic acid and 107 parts of the hydrochloride of β-chloroethylmorpholine. The mixture is heated at reflux temperature for 5 hours after which the solvent is removed under vacuum and the residue is treated with water. The aqueous layer is separated, washed with ether and rendered alkaline by the addition of sodium hydroxide. The base is extracted with ether and the ether extract is dried over anhydrous potassium carbonate, filtered and evaporated. The β-morpholinoethyl ester of 2-methyl-6-phenyl-3,4-dihydro-1,2-pyran-5-carboxylic acid boils at about 210° C. and 3 mm. pressure. 40 parts of the base are dissolved in 2200 parts of absolute ether and treated with one equivalent of hydrogen chloride in absolute ethanol solution. The resulting precipitate granulates quickly. The hydrochloride is crystallized from a mixture of absolute ethyl acetate and 2-propanol. The melting point is about 148–150° C. This salt has the structural formula

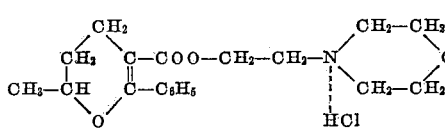

EXAMPLE 20

*δ-Dimethylaminobutyl ester of 6-isopropyl-3,4-dihydro-1,2-pyran-5-carboxylic acid*

A mixture of 250 parts of 6-isopropyl-3,4-dihydro-1,2-pyran-5-carboxylic acid and 203 parts of δ-chlorobutyldimethylamine in 100 parts of absolute 2-propanol is heated at reflux temperature for 8 hours. After standing for 12 hours water is added and the aqueous layer separated, washed with ether and rendered alkaline by the addition of potassium hydroxide. The base is extracted with ether and the ether extract is dried over anhydrous potassium carbonate, stirred with charcoal, filtered and evaporated. The clear oily residue has the structural formula

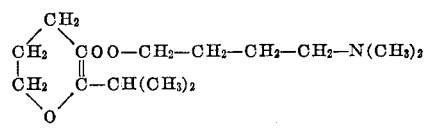

EXAMPLE 21

*γ-Pyrrolidinopropyl ester of 6-(p-tolyl)-3,4-dihydro-1,2-pyran-5-carboxylic acid*

To a cool solution of 13.2 parts of sodium in 800 parts of absolute isopropanol, 125 parts of 6-(p-tolyl)-3,4-dihydro-1,2-pyran-5-carboxylic acid and 106 parts of the hydrochloride of γ-chloropropylpyrrolidine are added. The mixture is heated at reflux temperature for 8 hours, and then left standing for 12 hours. The solvent is stripped and the residue extracted with water. The aqueous solution is washed with ether and rendered alkaline by the addition of potassium hydroxide. The base is extracted with ether, dried over anhydrous potassium carbonate, stirred with charcoal, filtered and evaporated. The residual light oil has the structural formula

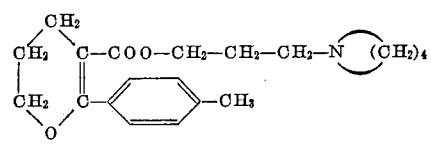

I claim:

1. A compound selected from the group consisting of those having the structural formula

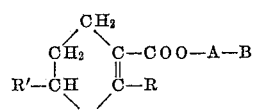

the acid addition salts thereof, and the quaternary ammonium salts thereof, wherein A is a lower alkylene radical; B is selected from the group consisting of

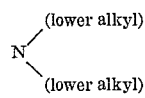

1-piperidyl, 1-pyrrolidyl, and 4-morpholinyl; R' is selected from the group consisting of hydrogen and lower alkyl; and R is selected from the group consisting of lower alkyl and monocyclic aryl.

2. The non-toxic salts of the dialkylaminoalkyl esters of 6-substituted 3,4-dihydro-1,2-pyran-5-carboxylic acids of the structural formula

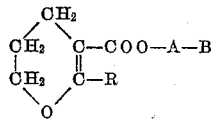

wherein R is a lower alkyl radical, A is a lower alkylene radical, and B is a lower dialkylamino radical.

3. The non-toxic salts of the dialkylaminoalkyl esters of 6-methyl-3,4-dihydro-1,2-pyran-5-carboxylic acid of the structural formula

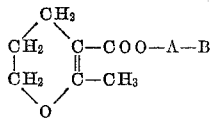

wherein A is a lower alkylene radical, and B is a lower dialkylamino radical.

4. The non-toxic salts of the diisopropylaminoalkyl esters of 2-methyl-3,4-dihydro-1,2-pyran-5-carboxylic acid of the structural formula

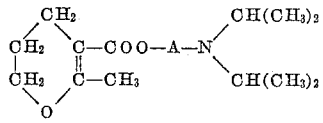

wherein A is a lower alkylene radical.

5. The non-toxic quaternary ammonium salts of the diisopropylaminoalkyl esters of 2-methyl-3,4-dihydro-1,2-pyran-5-carboxylic acid of the structural formula

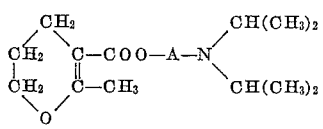

wherein A is a lower alkylene radical.

6. The non-toxic salts of the dialkylaminoalkyl esters of 6-phenyl-3,4-dihydro-1,2-pyran-5-carboxylic acid of the structural formula

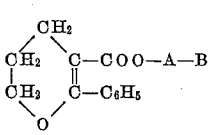

wherein A is a lower alkylene radical, and B is a lower dialkylamino radical.

7. The non-toxic salts of the diisopropylaminoalkyl esters of 6-phenyl-3,4-dihydro-1,2-pyran-5-carboxylic acid of the structural formula

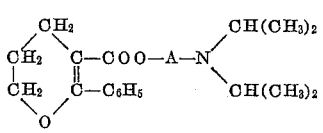

wherein A is a lower alkylene radical.

8. The non-toxic quaternary ammonium salts of the diisopropylaminoalkyl esters of 6-phenyl-3,4-dihydro-1,2-pyran-5-carboxylic acid of the structural formula

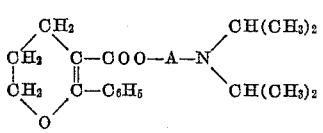

wherein A is a lower alkylene radical.

9. The non-toxic salts of the 2,6-disubstituted dialkylaminoalkyl esters of 3,4-dihydro-1,2-pyran-5-carboxylic acids of the structural formula

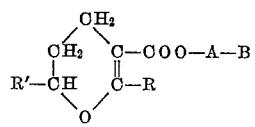

wherein R and R' are lower alkyl radicals, A is a lower alkylene radical, and B is a lower dialkylamino radical.

10. The non-toxic of the dialkylaminoalkyl esters of 2,6-dimethyl-3,4-dihydro-1,2-pyran-5-carboxylic acid of the structural formula

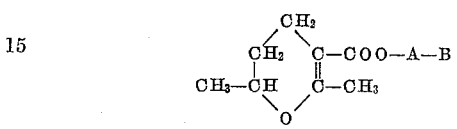

wherein A is a lower alkylene radical, and B is a lower dialkylamino radical.

11. The non-toxic salts of the diisopropylaminoalkyl esters of 2,6-dimethyl-3,4-dihydro-1,2-pyran-5-carboxylic acid of the structural formula

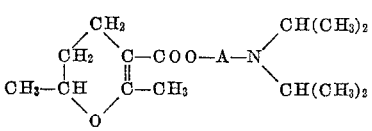

wherein A is a lower alkylene radical.

12. The non-toxic quaternary ammonium salts of the diisopropylaminoalkyl esters of 2,6-dimethyl-3,4-dihydro-1,2-pyran-5-carboxylic acid of the structural formula

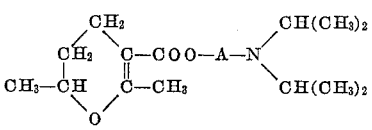

wherein A is a lower alkylene radical.

13. The non-toxic salts of the basic esters of 2-alkyl-6-phenyl-3,4-dihydro-1,2-pyran-5-carboxylic acids of the structural formula

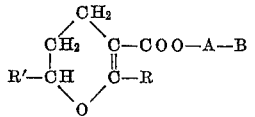

wherein R is a phenyl radical, R' is a lower alkyl radical, A is a lower alkylene radical and B is a lower dialkylamino radical.

14. The non-toxic quaternary ammonium salts of diisopropylaminoalkyl esters of 2-methyl-6-phenyl-3,4-dihydro-1,2-pyran-5-carboxylic acid of the structural formula

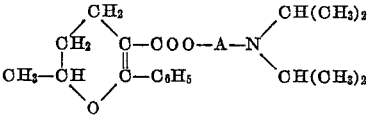

wherein A is a lower alkylene radical.

15. The basic esters of 2-methyl-6-phenyl-3,4-dihydro-1,2-pyran-5-carboxylic acid of the structural formula

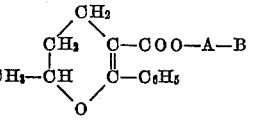

wherein A is a lower alkylene radical and B is a lower dialkylamino radical.

No references cited.